(12) United States Patent
Rammohan et al.

(10) Patent No.: US 8,527,475 B1
(45) Date of Patent: Sep. 3, 2013

(54) SYSTEM AND METHOD FOR IDENTIFYING STRUCTURED DATA ITEMS LACKING REQUISITE INFORMATION FOR RULE-BASED DUPLICATE DETECTION

(75) Inventors: Roshan Ram Rammohan, Seattle, WA (US); Madhu M Kurup, Bellevue, WA (US); Srikanth Thirumalai, Clyde Hill, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/239,068

(22) Filed: Sep. 21, 2011

(51) Int. Cl.
*G06F 17/30* (2006.01)

(52) U.S. Cl.
USPC ............................ 707/692; 707/758; 707/803

(58) Field of Classification Search
USPC ................. 707/692, 749, 755, 758, 803, 807
See application file for complete search history.

(56) References Cited

U.S. PATENT DOCUMENTS

| | | | |
|---|---|---|---|
| 6,785,671 B1 * | 8/2004 | Bailey et al. | 705/26.81 |
| 7,284,007 B1 * | 10/2007 | Francicus de Heer et al. | 1/1 |
| 7,765,127 B2 | 7/2010 | Banks et al. | |
| 8,285,721 B2 | 10/2012 | Ruvini et al. | |
| 2003/0216969 A1 * | 11/2003 | Bauer et al. | 705/22 |
| 2007/0027856 A1 * | 2/2007 | Lee | 707/3 |
| 2008/0313165 A1 * | 12/2008 | Wu et al. | 707/5 |
| 2009/0037244 A1 * | 2/2009 | Pemberton | 705/8 |
| 2009/0089314 A1 * | 4/2009 | Hicks | 707/102 |
| 2011/0153614 A1 * | 6/2011 | Solomon | 707/740 |

\* cited by examiner

*Primary Examiner* — Cam-Linh Nguyen

(74) *Attorney, Agent, or Firm* — Robert C. Kowert; Meyertons, Hood, Kivlin, Kowert & Goetzel, P.C.

(57) ABSTRACT

Embodiments of a system and method for identifying structured data items lacking requisite information for rule-based duplicate detection are described. Embodiments may include generating a deficiency score for each of multiple structured data items including applying a set of rules based on duplicate detection techniques to each given structured data item in order to perform a comparison of the given structured data item to itself. The deficiency score of the given structured data item may be based on a result of the comparison. Embodiments may also include, based on the deficiency scores of the structured data items, identifying one or more deficient structured data items having less than a requisite quantity of information for performing duplicate detection on structured data items. Embodiments may also include identifying one or more key attributes missing from some of the one or more deficient structured data items and requesting those key attributes.

25 Claims, 8 Drawing Sheets

| Property | Item (ID: B000BZJ69S) | Item (ID: B00VAS0FC) |
|---|---|---|
| Item name | Bosch 13860 Oxygen Sensor, OE Type Fitment | Bosch 13860 Oxygen Sensor |
| GTIN | 28651138604 | NA |
| Item Package Quantity | 1 | 1 |
| Manufacturer | Bosch | Bosch |
| Brand | Bosch | Bosch |
| Part number | 13860 | 13860 |
| Catalog number | 13860 | NA |
| Product type | Auto part | Auto accessory |
| Price per box | 77.54 | 122.72 |
| Product group | Automotive | Automotive |
| Item classification | Base product | Base product |
| Item type keyword | Automotive, oxygen, sensors | Automotive, accessories |
| Matching part number | 13860 | 13861 |
| Part type identifier | 5132 | 5132 |
| Product description | Bosch original equipment oxygen sensors are designed for identical OE fit, no cutting or wire splicing is necessary. Bosch invented the first oxygen sensor and has provided best in class performance and maximum service life so that they are the #1 OE and aftermarket sensor. Premium ceramic technology incorporates Zirconium or titania and yttrium provides superior protection against mechanical and thermal shock. | OE TYPE BEFORE CATALYST |

Columns labeled 200, 202, 204.

*FIG. 2*

| Property | Item (ID: B000BZJ89S) | Item (ID: B000VASOVA) |
|---|---|---|
| Item name | Bosch 13860 Oxygen Sensor, OE Type Fitment | 13860 OS Sensor |
| GTIN | 28851138604 | |
| Item Package Quantity | 1 | |
| Manufacturer | Bosch | |
| Brand | Bosch | |
| Part number | 13860 | |
| Catalog number | 13860 | |
| Product type | Auto part | |
| Price per box | 77.54 | |
| Product group | Automotive | |
| Item classification | Base product | |
| Item type keyword | Automotive, oxygen, sensors | |
| Matching part number | 13860 | |
| Part type identifier | 5132 | |
| Product description | Bosch original equipment oxygen sensors are designed for identical OE fit, no cutting or wire splicing is necessary. Bosch invented the first oxygen sensor and has provided best in class performance and maximum service life so that they are the #1 OE and aftermarket sensor. Premium ceramic technology incorporates Zirconium or titania and yttrium provides superior protection against mechanical and thermal shock. | |

*FIG. 3*

| Deficiency Score | All Item Description Entries | Failed Match Entries |
|---|---|---|
| 0 | 1845 | 786.00 |
| 1 | 0 | 0.00 |
| 2 | 0 | 0.00 |
| 3 | 0 | 0.00 |
| 4 | 272 | 212.00 |
| 5 | 0 | 0.00 |
| 6 | 16 | 12.00 |
| 7 | 14 | 9.00 |
| 8 | 0 | 0.00 |
| 9 | 202 | 118.00 |
| 10 | 0 | 0.00 |
| 11 | 38 | 31.00 |
| 12 | 185 | 182.00 |
| 13 | 168 | 166.00 |
| Totals | 2740 | 1516 |

# SYSTEM AND METHOD FOR IDENTIFYING STRUCTURED DATA ITEMS LACKING REQUISITE INFORMATION FOR RULE-BASED DUPLICATE DETECTION

BACKGROUND

Merchants that operate network-accessible marketplaces may maintain electronic catalogs that include thousands of items (or more) offered for sale. These electronic catalogs often include item detail pages accessible through one or more networks (e.g., web pages accessible over the Internet). These item detail pages often include descriptive information (e.g., text descriptions, pictures or video) in order to assist a buyer in determining whether an item is worth purchasing. In many cases, this descriptive information may be based on information from manufacturers or suppliers of the items offered for sale. In some cases, different manufacturers and suppliers may provide the descriptive information to the merchant in different formats. For example, one supplier may list one type of identifier for an item as a part number whereas another supplier of that same item might list that identifier as a model number. In some cases, some suppliers may provide very detailed item information for an item whereas another supplier might provide very basic information. For instance, one supplier might include a text description including comprehensive marketing literature whereas another supplier might omit such description and only include basic information, such as a part or model number. Due at least in part to these types of variations in item information received from different suppliers of the same item, identifying duplicate item information (e.g., two sets of item information that may be different but nevertheless describe the same item) may not be an insignificant task.

BRIEF DESCRIPTION OF THE DRAWINGS

FIG. 2 illustrates an example of duplicate item description entries, according to some embodiments.

FIG. 3 illustrates another example of duplicate item description entries, according to some embodiments.

While the system and method for identifying structured data items lacking requisite information for rule-based duplicate detection is described herein by way of example for several embodiments and illustrative drawings, those skilled in the art will recognize that the system and method for identifying structured data items lacking requisite information for rule-based duplicate detection is not limited to the embodiments or drawings described. It should be understood, that the drawings and detailed description thereto are not intended to limit the system and method for identifying structured data items lacking requisite information for rule-based duplicate detection to the particular form disclosed, but on the contrary, the intention is to cover all modifications, equivalents and alternatives falling within the spirit and scope of the system and method for identifying structured data items lacking requisite information for rule-based duplicate detection as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Figure 1:
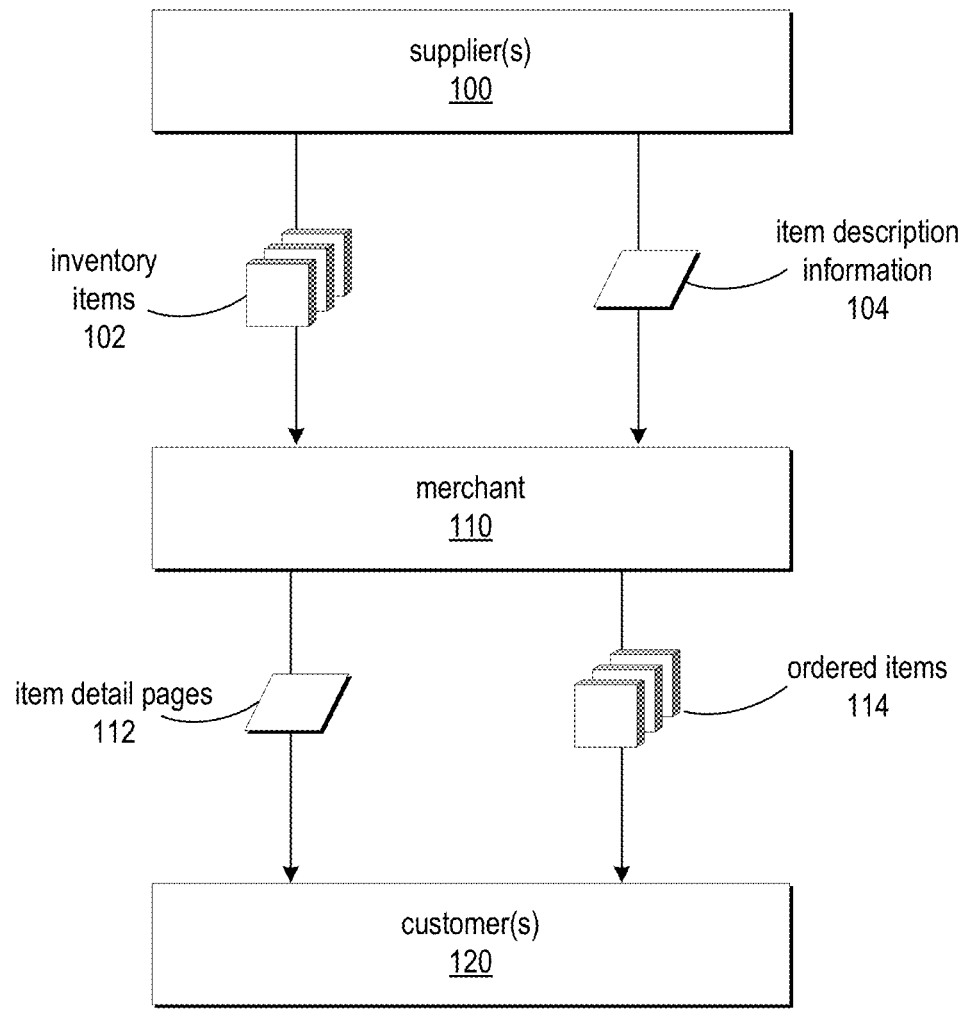
FIG. 1 illustrates a block diagram of the interactions between one or more suppliers, a merchant, and one or more customers, according to some embodiments.

Various embodiments of a system and method for identifying structured data items lacking requisite information for rule-based duplicate detection are described. Embodiments may include evaluating item description information for different items, such as items offered for sale through an electronic commerce portal or other avenue. FIG. 1 illustrates a flow diagram of interactions between a merchant and its suppliers and customers. In the illustrated embodiments, merchant 110 may receive inventory items 102 from one or more suppliers. These suppliers may also provide item description information 104 to the merchant. For instance, the item description information may include details and characteristics (e.g., images, videos, text descriptions, specifications, part numbers, model numbers, manufacturer information and other information about an item) that may be used to construct item detail pages 112 viewed by customers; customers may order items 114 from the merchant based on information in the item detail pages. In various embodiments, the merchant may use the item description information as the basis for identifying an item received from a supplier. In many cases, the provided item description information may vary among different suppliers, even in cases where the item description information pertains to the same item. For example, the item description information may differ across suppliers for any of a variety of reasons including but not limited to differences in nomenclature. For example, one supplier may refer to an item identifier as a part number whereas another identifier may refer to that same identifier as a model number. In another example, suppliers may use different terms or phrases to describe the type of product that an item is. In various instances, if these types of differences are not recognized, the merchant or other entity that receives the item description information may interpret the information as pertaining to two different items even in cases where such information does indeed described the same item.

In various embodiments, item description information may be stored by the merchant as item description entries which may adhere to a structured or semi-structured format. For clarity of description, different item description entries that pertain to the same item may be referred to herein as duplicate item description entries or simply "duplicates." Embodiments may include a duplicate detection engine configured to analyze item description entries in order to determine whether the item description entry for one item and the item description entry for another item are duplicates. In various embodiments, the duplicate detection engine may be a rules-based engine, which may be configured to identify duplicates using manually-specified rules, rules generated with a genetic algorithm, other machine-generated rules, or some combination thereof.

In some embodiments, the duplicate detection engine may be utilized to identify duplicate item description entries (e.g., entries that correspond to the same item offered for sale) such that the entries may be merged. For example, a merchant may rely on item description entries to generate item detail pages that are available to customers. For instance, item detail pages could be web pages available through a network-based marketplace and customers could browse such item detail pages from remote client devices equipped with web browsers. In this example, the presence of duplicate item description entries could result in the creation of two or more item detail pages for the same item. In some cases, it may be desirable to avoid this situation as it may provide a less streamlined browsing experience for customers and may discourage price competition among third party sellers. By identifying and merging duplicate item description entries, embodiments may prevent the creation of two or more item detail pages for the same item. In another example, duplicate item description entries may cause the generation of multiple inventory records for the same item. For instance, if a merchant does not recognize duplicate item description information for a particular item, the merchant might mistakenly generate two or more independent inventory records for the same item. In some cases, such unintended partitioning of inventory records might induce suboptimal merchant operations. For instance, if one of the inventory records for an item indicates that the item is nearly out of stock, the merchant might needlessly order additional stock of the item if the merchant is not immediately aware of other inventory records that indicate a sufficient quantity of that item is held in inventory. By identifying and merging duplicate item description entries, embodiments may prevent the duplicate information from propagating throughout the merchant's systems.

In various embodiments, the aforesaid duplicate detection engine may be configured to evaluate multiple stored item description entries and determine which item description entries are duplicates. In various embodiments, the performance of the duplicate detection engine may depend on the quality of the duplicate detection rules used. For instance, a high quality rule set may enable the duplicate detection engine to exhibit high performance characteristics when detecting duplicates, such as high precision and recall. However, even in cases where a high quality rule set is utilized, the duplicate detection engine may fail to identify a duplicate pair of item description entries if one or both of those entries is lacking the requisite information for duplicate detection. This requisite information may vary among item description entries of different product categories. For instance, item description entries for sporting goods may be grouped into one set and item description entries for home and garden items may be grouped into another set. Note that these product categories are merely examples. In other cases, item description entries may be grouped into sets corresponding with other product categories, such as books, movies, music, games, electronic, computers, tools, grocery, health & beauty, toys, kids & babies, clothing, shoes, jewelry, automotive or some other product category. In various embodiments, different product categories may have different attributes pertinent to duplicate detection. For instance, a "dial color" attribute may be a relevant characteristic for a jewelry product category that includes watches, but may be largely irrelevant for a clothing category as clothes do not contain dials. In other words, in different product categories, different attributes may be more useful for discerning whether pairs of item description entries are duplicates. In some cases, if these key attributes are missing from item description entries (e.g., if item suppliers do not provide this information), it may be difficult to perform duplicate detection even in cases where a high quality rule set is used by the duplicate detection engine.

As described in more detail below, merchant 110 may utilize various components to identify which item description entries lack the requisite information for rule-based duplicate detection as well as which attributes are the most important for duplication detection. Embodiments may also include identifying suppliers that historically have failed to provide these attributes as part of their item description information 104. The merchant may notify these suppliers in an effort to improve the quality of the item description information as well as the efficacy of the duplicate detection engine. In various embodiments, information demonstrating the relative strength of items sales (or other metrics) for well-formed item description information when compared to items having deficient item description information (i.e., item description information lacking key attributes for the respective item's product category) may be provided to the merchants as an incentive to improve the item description information provided to the merchant. By using this technique to improve the item description information, embodiments may increase the quality of the item description entries that the duplicate detection engine analyzes. In turn, the duplicate detection engine may more accurately identify duplicates.

Example Item Description Entries

FIG. 2 illustrates an example of two well-formed item description entries that are duplicates. In the illustrated embodiment, the item description information may include multiple different attributes 200 (also referred to as properties) for a particular item, such as various identifiers, characteristics, and descriptions. As illustrated, the item description information for the same item may vary across suppliers. For instance, item description information 202 may be provided by one supplier and item description information 204 may be provided by another supplier; this information may be different even though it pertains to the same item, namely a specific oxygen sensor in the illustrated example. For example, in the illustrated example, one supplier refers to the example oxygen sensor as being part of an "Auto part" product type and the other supplier refers to the sensor being part of an "Auto accessory" product type. In any case, the two item description entries contain rich data and the duplicate detection engine described herein may identify these entries as duplicates based on such data.

Figure 4:
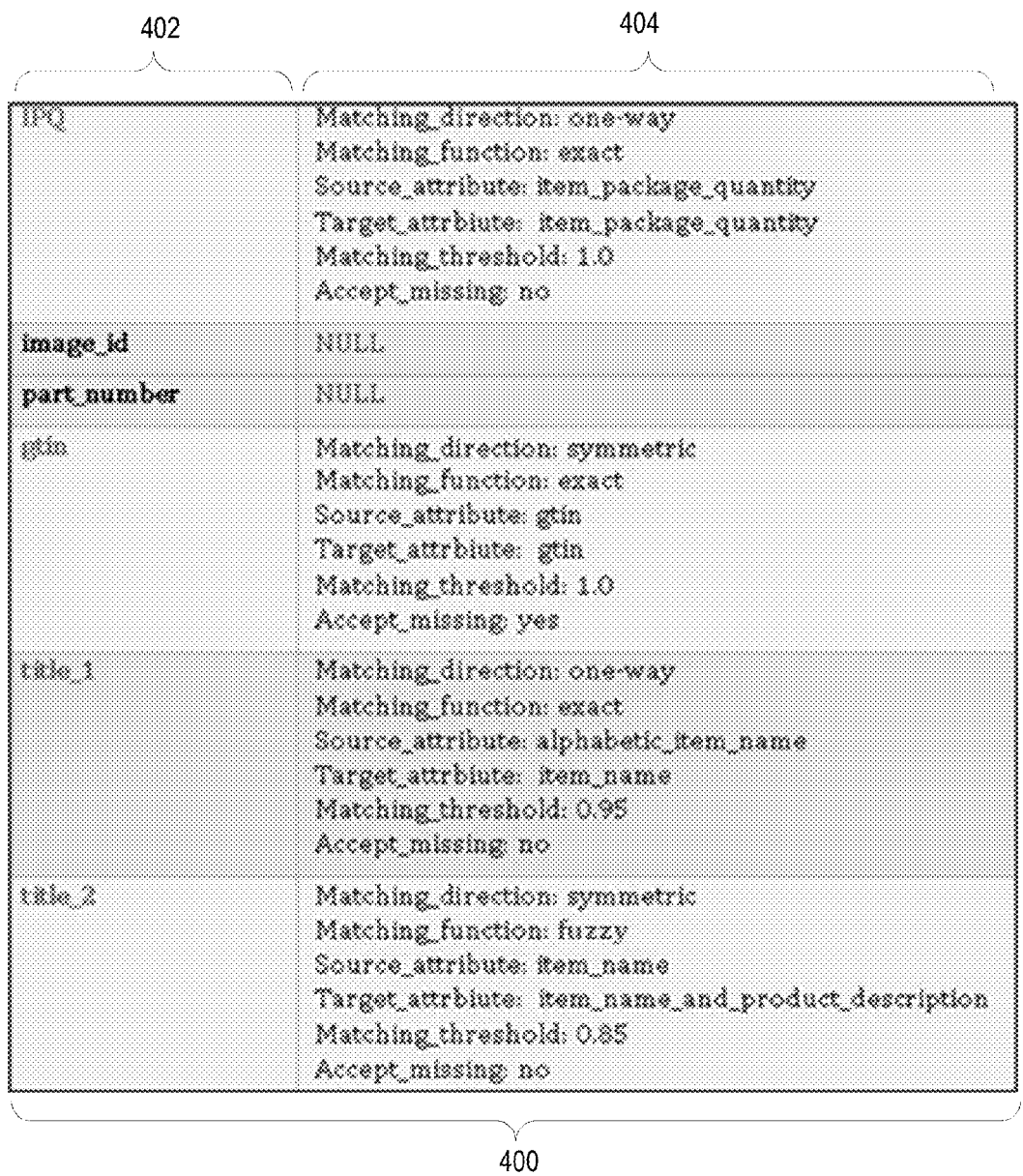
FIG. 4 illustrates an example duplicate detection rule, according to some embodiments.

FIG. 3 illustrates an example of duplicate item description entries, including one that is not well-formed. In various instances, item description entries that are not well-formed may be referred to as having a deficiency. Deficient item description entries may include less data than their well-formed counter parts. This deficiency may increase the likelihood that an item description entry will be properly identified as a duplicate of another item description entry, even in cases where the duplicate detection engine utilizes a high quality rule set. In FIG. 3, item description entry 300 represents a deficient item description entry as it contains little more than an item title. As such, even though item description entry 300 and item description entry 202 are duplicates, some rules-based analyses relying on comparisons of multiple different properties (such as some implementations of the rule-based duplicate detection techniques described herein) may not positively identify item description entries 202 and 300 as duplicates. FIG. 4 describe below illustrates the structure of an example duplicate detection rule according to some embodiments.

Example Duplicate Detection Rule

In various embodiments, to reduce or eliminate the presence of duplicate item description entries, merchants (or other entities) may utilize a rule-based duplicate detection system to identify and/or merge such duplicates into single entries. As described in more detail below, the duplicate detection system may include a duplicate detection engine configured to use a rule set to evaluate multiple item description entries and identify and/or merge duplicate entries. In various embodiments, such a rule set may include multiple rules, each of which may include multiple rule conditions. FIG. 4 illustrates one such example rule. In the illustrated embodiment, rule 400 includes multiple rule conditions 402, each of which may include one or more elements 404. For instance, the first rule condition of the illustrated rule pertains to item package quantity or "IPQ." Additionally, the IPQ rule condition includes multiple parameters that generally specify how a portion of one item description entry should be compared to another item description entry for duplicate detection. For the illustrated IPQ rule condition, the condition parameters specify that one-way evaluation of the source attribute and the target attribute is sufficient. In this case, the source attribute is the "item_package_quality" attribute of the first item description entry and the target attribute is the "item_package_quality" attribute of the second item description entry. As illustrated, a rule condition may also designate a particular matching function with which to compare the attributes. Also illustrated, the condition may specify a matching threshold score that should be met in order for the rule condition to be met. In the IPQ rule condition, this threshold score is 1.0. In other words, the "exact" matching function must at a minimum return a score of 1.0 in order for the IPQ rule condition to resolve to true for the pair of item description information entries being evaluated.

In the illustrated embodiment, a number of other rule conditions are illustrated (e.g., "gtin," "title_1" and "title_2"). In some cases, other available rule conditions may not be used for this particular rule. As illustrated, these rule conditions are marked "null" for rule 400. In various embodiments, various other rule conditions for evaluating pairs of item description entries may be utilized. For instance, rule conditions that are not illustrated and/or variations of the illustrated rule conditions may be utilized. Furthermore, while not illustrated in the particular example rule of FIG. 4, the rule conditions of a given rule may be associated by one or more Boolean logic operators (e.g., AND, OR, etc.). For instance, the "AND" Boolean operator may be utilized to specify that in order for one item description entry to be considered a duplicate of another item description entry, all rules conditions of the rule must be met. Rules themselves may also be linked or associated with other rules through similar Boolean logic operators.

As noted above, in various embodiments multiple rules may be aggregated together as part of one or more rule sets, which may be interpreted and utilized by a duplicate detection engine in order to identify and/or merge item description entries. In various embodiments, the rule set(s) may be generated utilizing genetic algorithm techniques and/or administrator-generated rule sets.

In various embodiments, rules similar to rule 400 may be utilized by the duplicate detection engine in order to identify duplicates. In cases where item description entries are deficient (e.g., item description entry 300), duplicate detection rules may be rendered ineffective as the rule conditions may have insufficient information for comparison. As noted above, by using the techniques described herein to improve the item description information, embodiments may increase the quality of the item description entries that the duplicate detection engine analyzes. In turn, the duplicate detection engine may more accurately identify duplicates.

Identifying Deficient Item Description Entries

Figure 5:
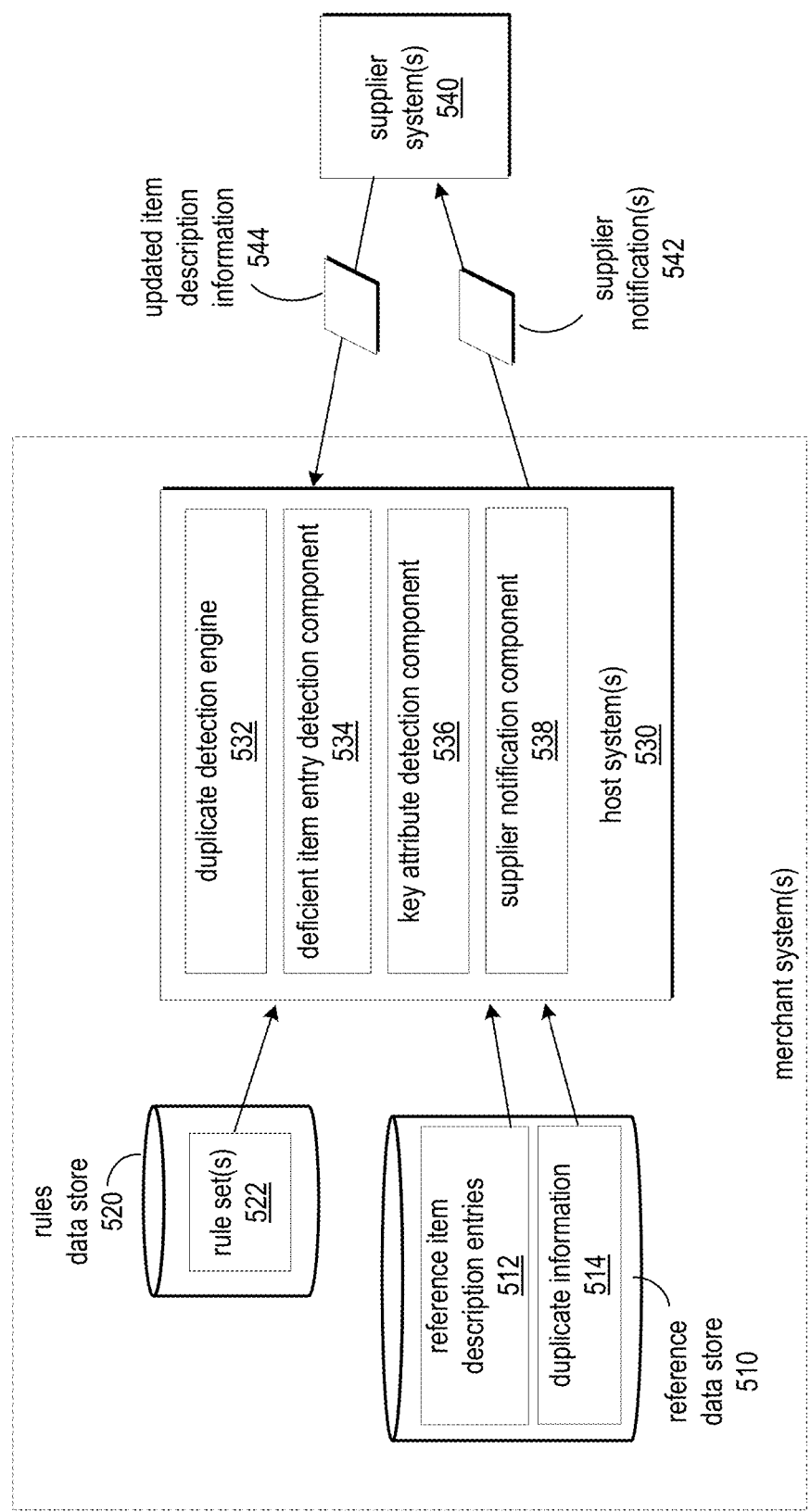
FIG. 5 illustrates a block diagram of the elements of a system and method for identifying structured data items lacking requisite information for rule-based duplicate detection, according to some embodiments.

In various embodiments, the duplicate detection engine described herein, along with other components described in more detail below, may be utilized to identify deficient item description entries. Each deficient item description entry may lack the requisite attributes needed to identify the item description entry as a duplicate of some other item description entry. FIG. 5 illustrates example systems that may be utilized by a merchant to identify deficient item description entries. In the illustrated embodiment, one or more host system 530 may include a duplicate detection engine 532, a deficient item entry detection component, a key attribute detection component 536, and a supplier notification component 538. In various embodiments, one or more of host system(s) 530 may be implemented on a computer, such as the computer system of FIG. 9 described below. In various embodiments, the duplicate detection engine 532 may utilize one or more rule set(s) 522 including rules of data store 520 in order to detect duplicate item description entries. In various embodiments, rule set(s) may include one or more rules similar to rule 400 described above. In some cases, one or more of the rule sets 522 may be conditioned prior to using the rule sets for identifying deficient item description entries. For instance, in some embodiments, a rule set may be conditioned by removing all "accept missing" clauses from the rules of that rule set (see e.g., "accept missing" clause in FIG. 4). By conditioning rules in this manner, embodiments may prevent a rule evaluating to true (e.g., where "true" indicates the discovery of a duplicate) when one or more respective attributes within an item description entry are empty. In other words, in some embodiments, the rule set(s) may require that there be non-null information within an attribute field of an item description entry in order to use that attribute as the basis for identifying a duplicate. As noted above, in various embodiments multiple rules may be aggregated together as part of one or more rule sets, which may be interpreted and utilized by a duplicate detection engine in order to identify and/or merge item description entries. In various embodiments, the rule set(s) may be generated utilizing genetic algorithm techniques and/or administrator-generated rule sets. As noted above, different product categories may include different attributes pertinent to that category. For instance, a dial color may be pertinent to a jewelry product category that contains watches, but not pertinent to other categories. In another example, a processor type or RAM size attribute may be pertinent to a computer category, but not pertinent to other categories (e.g., apparel or sporting goods). As such, in various embodiments, different rule sets may be created for different product categories. In some cases, the creation, definition or specification of rules may be done explicitly by an administrator or developer tasked with constructing different rules for different product categories. In some embodiments, at least some rules of the rule sets may be generated using genetic algorithm techniques that evolve a population of rules over time based on their performance. As an example, techniques for evolving a population of rules may include crossover operations to spawn child rules from high-performing parent rules as well as random or pseudo-random mutation operations.

Reference item description entries 512 may include a sample of item description entries selected from a larger population of item description entries maintained by the merchant. For these item description entries, the merchant may determine definitive duplication information 514 that indicates which pairs of item description entries 512 are duplicates. This duplication information 514 may in some cases be determined by one or more agents that inspect the attributes of item description entries 512 in order to make a positive assertion as to which pairs of item description entries are duplicates. These assertions may be stored as duplicate information 514.

Deficient item entry detection component 534 may be configured to identify which item description entries are lacking the requisite information for duplicate detection by applying one of rules set(s) 522 to known pairs of duplicates from reference item description entries 512 (e.g., "known" as specified by duplication information 514). For instance, deficient item entry detection component may be configured to, for each of multiple item description entries, apply multiple rules from a rule set 522 to that item description entry and its known duplicate item description entry. For instance, the particular rules set chosen may be a rule set for a product category that matches the item described by the item description entries of the duplicate pair. In general, the known duplicate may be previously verified or otherwise known to contain the requisite information needed to positively identify a duplicate with a rules set 522. The item description entry being compared to the known duplicate may or may not contain the requisite information needed to be positively identified as a duplicate. The deficient item entry detection component may be configured to determine a measure or score of the amount of missing information within an item detail entry referred to herein as a deficiency score.

For a given item description entry, the deficient item description entry detection component may be configured to generating deficiency score for the given item description entry as being the number of rules within a rule set 522 that are not satisfied when duplicate detection engine 532 applies that rule set to the given item description entry and its known duplicate. For example, if a rule set had 13 duplicate detection rules, the minimum deficiency score would be 0, indicating a very low level of missing information (e.g., attributes) within the given item description entry, and the maximum deficiency score would be 13, indicating a very high level of missing information within the given item description entry.

Figures 6, 7:
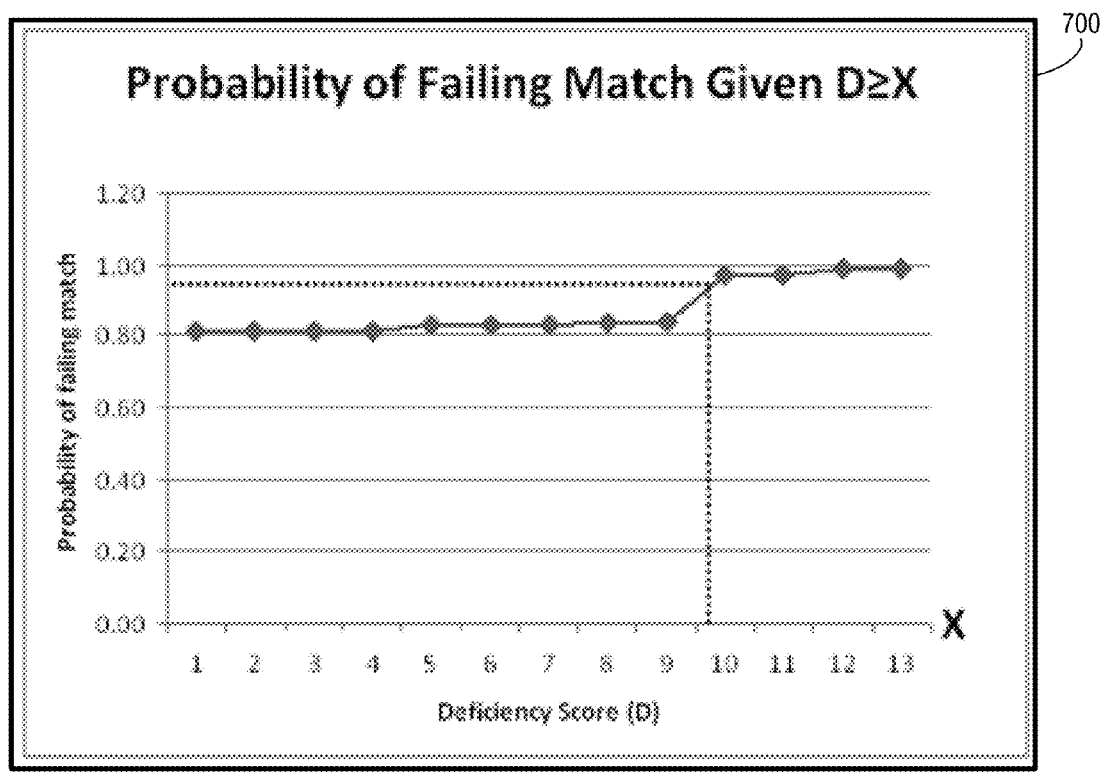
FIG. 6 illustrates an example frequency distribution of deficiency scores, according to some embodiments.
FIG. 7 illustrates a graphical representation of the probability of a failing match given a minimum deficiency score, according to some embodiments.

In various embodiments, the deficient item description entry detection component may determine a deficiency score for each item description entry within reference item description entries 512. FIG. 6 illustrates an example frequency distribution 600 of deficiency scores for a reference set of 2,740 item description entries. In the illustrated example, the deficient item entry detection component 534 has assigned deficiency scores to each entry in accordance with the techniques described above; these scores range from 0, indicating a very low level of missing information within an item description entry, to 13, indicating a very high level of missing information. For instance, in the illustrated embodiment, the second column indicates that 1,845 item description entries were assigned a deficiency score of 0, 168 description entries were assigned a deficiency score of 13, and numerous item description entries were assigned some score in between 0 and 13. Within the set of item description entries having a particular deficiency score, the duplicate detection engine may have failed to match some sub-portion of this set with known duplicates.

Note that in some embodiments, even item description entries with low deficiency scores (indicating a low level of missing information) may result in a failed match. As such these failed matches are in most cases caused by reasons other than a lack of requisite information needed for duplicate detection. Possible reasons for such failed matches may include but are not limited to a poorly structured rule set. For example, there may be a substantial number of item description entries which have sufficient information in them for being associated with a low deficiency score, but are nevertheless not matched with its known duplicates. In various embodiments, to improve improving the recall of the duplicate detection engine, the deficient item entry detection component may generate an alert or other message that indicates the quality of the rule set needs to be improved or otherwise investigated. In various embodiments, this functionality may help system administrators and/or developers to improve the overall quality of results produced by the duplicate detection engine.

In various cases, it may be observed that there is a strong correlation between item description entries with high deficiency scores and failures of the duplicate detection engine in being able to match an item description entry with its known duplicates. For instance, this characteristic may result from several of the key terms and attributes being absent in the item description entry. As such, the deficient item entry detection component may be utilized to determine which item description entries lack the requisite informant needed for duplicate detection. For instance, if the ratio between frequencies for all item description entries relative to frequencies of failed match item description entries becomes very close to 1 above a certain deficiency score (e.g., see "threshold score" below), this may be inferred to be an indication that these item description entries are failing to match with their duplicates primarily due to missing information. Other item entries that fail to match but have lower deficiency scores may contain substantial information; these failures may be due to reasons other than missing information (e.g., a low quality rule set).

One way in which the deficient item entry detection component may distinguish the item description entries that lack the requisite informant needed for duplicate detection from well-formed item description entries is on the basis of deficiency score. FIG. 7 illustrates a plot or graphical representation 700 of the probability of a failing match for a given minimum deficiency score, which may be generated from the data of table 600. The deficient item entry detection component may be configured to apply a specified threshold probability to the data; in the illustrated example, this threshold is a probability of 0.95 (as indicated by the horizontal dashed line), although higher or lower thresholds may be used in other instances. In the illustrated embodiment, a deficiency score of 10 may be identified from the threshold probability of 0.95 based on an interpolation of the plotted probability of a failing match for a given minimum deficiency score.

Identifying Key Attributes

From this deficiency score, the deficient item entry detection component 536 may be configured to distinguish two groups of item description entries: a group of well-formed item description entries and a group of deficient item description entries. Generally, items description entries within the well-formed group may contain the requisite information for duplicate detection. Likewise, item description entries within the well-formed group may lack the requisite information for duplicate detection. Key attribute detection component 536 of FIG. 5 may evaluate the differences between these two groups in order to determine which attributes are key to duplicate detection. In various embodiments, key attribute detection component 536 may be configured to determine the attributes that are found most frequently within the group of well-formed item description entries and additionally not found within the group of deficient item description entries. In various embodiments, to identify these attributes, the key attribute detection component 536 may be configured to generate a value of relative importance (RI) for each attribute of found in reference item description entries 512. In one embodiment, for a given attribute, the key attribute detection component may be configured to generate the attribute's RI as being the complement of (e.g., 1 minus) the fraction of entries which have a deficiency score of 0 and are missing a that attribute. In various embodiments, if all entries having a deficiency score of 0 are missing the given attribute, then that attribute may be determined to have a relative importance of 0. Conversely, if no entry having deficiency score of 0 is missing the given attribute, then that attribute may be determined to have a relative importance of 1. If some entries having a deficiency score of 0 are missing the given attribute, then that attribute may be determined to have a relative importance falling between 0 and 1. Generally, the more item description entries that are not missing a given attribute, the higher that attributes relative importance will be.

In various embodiments, to determine which attributes are key attributes, key attribute detection component 536 may be configured to rank attributes based on their relative importance value and select the n-highest ranked attributes as being key attributes (where n is a configurable parameter). In one non-limiting example, the key attribute detection component may select the top three attributes from the aforesaid ranking as being key attributes.

Querying Suppliers for More Descriptive Item Description Information

Supplier notification component 538 may utilize the key attributes generated by key attribute detection component 536 to identify suppliers (e.g., on or more of suppliers 100) that should be contacted in order to improve the quality of item description information. For example, supplier notification component 538 may evaluate the deficient item description entries to identify the entries that are missing the key attributes determined by the key attribute detection component 536. The identified entries may be found in reference item description entries 512 as well as the entries for the merchant's entire product catalog. The supplier notification component may also identify the merchants associated with these item description entries (e.g., the merchants that submitted the portions of item description information 104 that correspond to those entries). Supplier notification component 538 may generate one or more notifications 542 and provide them to respective supplier system(s) 540. In various embodiments, a given notification may identify the key attributes that the supplier is requested to specify for one or more items. In response, suppliers may send updated item description information 544 to the merchant; this item description information may include the attributes requested by notifications 542. The merchant may update its item description entries with the updated item description information 544. This may improve the quality of the item description entries and may also increase the yield of duplicates detected by the duplicate detection engine 532.

In various embodiments, sales of items having well-formed item description entries may outpace sales of items having deficient item description entries. For instance, consider an example golf club product listing that lists handedness as an attribute relative to a product listing for a golf club that does not list handedness. Buyers may have a higher propensity to purchase an item for which handedness is specified instead of buying an item without knowing the handedness. This type of information may be indicated in supplier notifications 542 in order to incentivize suppliers to provide the key attributes of the items they supply. In a similar case, pages views or "hits" (and by extension, the likelihood of a purchase) for items having well-formed item description entries may exceed those of items having deficient item description entries. This type of information may be also be specified in supplier notifications 542 in order to incentivize suppliers to provide the key attributes of the items they supply.

Note that while the description presented herein is largely directed to the detection of duplicates, variations of these techniques may also be applied to other objectives, such as the detection of related items for item recommendations or relevant advertisements.

Example Method

Figure 8:
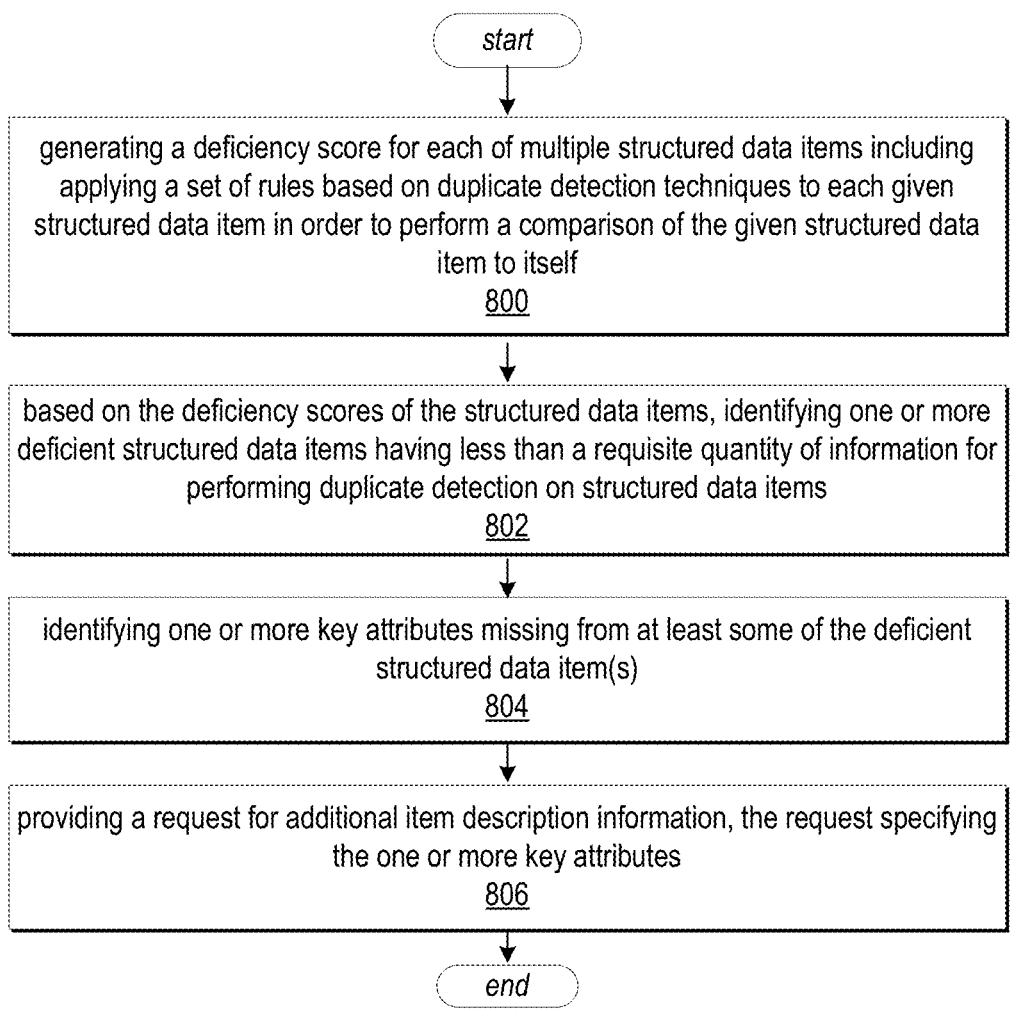
FIG. 8 illustrates a flowchart of an example method for using deficiency scores to identify deficient item description entries as well as key attributes that those entries are missing, according to some embodiments.

The system and method for identifying structured data items lacking requisite information for rule-based duplicate detection may include various methods, such as the method illustrated in FIG. 8. In various embodiments, the illustrated method may be performed by host system(s) 530. In some embodiments, the illustrated method may be performed by one or more computers, such as the computer system of FIG. 9 described below.

As illustrated at block 800, the method may include generating a deficiency score for each of multiple structured data items, such as the item description entries described herein or some other data item that includes structured information. While the description herein largely refers to item description entries, any of the techniques described herein may be performed on more general information, including structured data items. In various embodiments, generating the deficiency score may include applying a set of rules based on duplicate detection techniques to each given structured data item in order to perform a comparison of the given structured data item to itself. For instance, as described above, a rule set may be conditioned by removing all "accept missing" clauses from the rules of that rule set (see e.g., "accept missing" clause in FIG. 4). By conditioning rules in this manner, embodiments may prevent a rule evaluating to true (e.g., where "true" indicates that one or more requisite criteria have been met) when one or more respective attributes within an item description entry are empty. In some cases, the resulting rules of this rule conditioning process may be referred to as attributed deficiency rules. These rules may form the set of rules that are applied at 804. Furthermore, while these rules are described as being generated through the aforesaid conditioning process (e.g., removal of "accept missing" clauses), the rule set that is applied may include any rules based on other rules for duplicate detection, or based on duplicate detection techniques in general. In various embodiments, the deficiency score of the given structured data item may be based on a result of the comparison of block 804. For instance, in some embodiments, the deficiency score of a given structured data item may be generated as being the number of rules that are not met when the set of rules is applied to perform a comparison of the given structured data item to itself. For example, these deficiency scores may be similar to those described above with respect to FIGS. 5-7.

As illustrated at block 802, the method may include, based on the deficiency scores of the structured data items, identifying one or more deficient structured data items having less than a requisite quantity of information for performing duplicate detection on structured data items. For instance, this portion of the method may include applying a deficiency score threshold to the scored data items in order to identify one or more deficient structured data items, such as by using the techniques described above with respect to separating well-formed entries and deficient entries. For instance, in various embodiments, this portion of the method may include distinguishing structured data items having deficiency scores above the threshold from structured data items have deficiency scores below the threshold.

As illustrated by block 804, the method may include identifying one or more key attributes missing from at least some of the one or more deficient structured data items. In various embodiments, this portion of the method may include performing techniques similar to those described above with respect to key attribute identification. In some cases, this portion of the method may include evaluating the differences between groups of well-formed structured data items and deficient structured data items in order to determine which attributes are key to duplicate detection. For instance, the method may include determining the attributes that are found most frequently within the group of well-formed structured data items and additionally not found (or found infrequently) within the group of deficient structured data items. In various embodiments, this portion of the method may include using measures of relative importance (described above) to identify deficient structured data items. In various embodiments, by identifying these key attributes automatically, embodiments relieve system users of the burden of learning new or complex product categories having unfamiliar product attributes. For instance, a user is unfamiliar with golf might not be able to determine that left or right handedness is a key attribute of this category of products. In general, the techniques described herein may be scaled up to any size product catalog including multiple items classified under multiple categories and/or subcategories. In a non-limiting example, product categories may include any of those categories described above including but not limited to sports, books, movies, music, games, electronic, computers, tools, grocery, health & beauty, toys, kids & babies, clothing, shoes, jewelry, automotive or some other product category. In another non-limiting example, subcategories of a sports category might include golf, baseball, football, or some other sport.

As illustrated at block 806, the method may also include providing a request for addition item description information; this request may specify the one or more key attributes identified at block 804. For instance, this portion of the method may include providing this type of request to a specific supplier that has failed to previously provide these attributes within their item description information (e.g., item description information 104 of FIG. 1). In various embodiments, the method may also include receiving the requested information and updating item description information accordingly to improve the quality of the item description (e.g., for duplicate detection or other purposes). One example of this is described above with respect to FIG. 5 (see e.g., item 544).

Example Computer System

Various embodiments of the system and method for identifying structured data items lacking requisite information for rule-based duplicate detection, as described herein, may be executed on one or more computer systems, which may interact with various other devices. Note that any component, action, or functionality described above with respect to FIGS. 1-8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 may be configured to implement any functionality of the duplicate detection engine 532, deficient item entry detection component 534, key attribute detection component 536, and supplier notification component 538 described above. Additionally, data 932 of memory 920 may store any of the information or data structures described above, including but not limited to rule set(s) 522, reference item description entries 512, and/or duplicate information 514. In some embodiments, program instructions and/or data may be received, sent or stored upon different types of computer-accessible media or on similar media separate from system memory 920 or computer system 900. While computer system 900 is described as implementing the functionality of functional blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., supplier system(s)

540) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Figure 9:
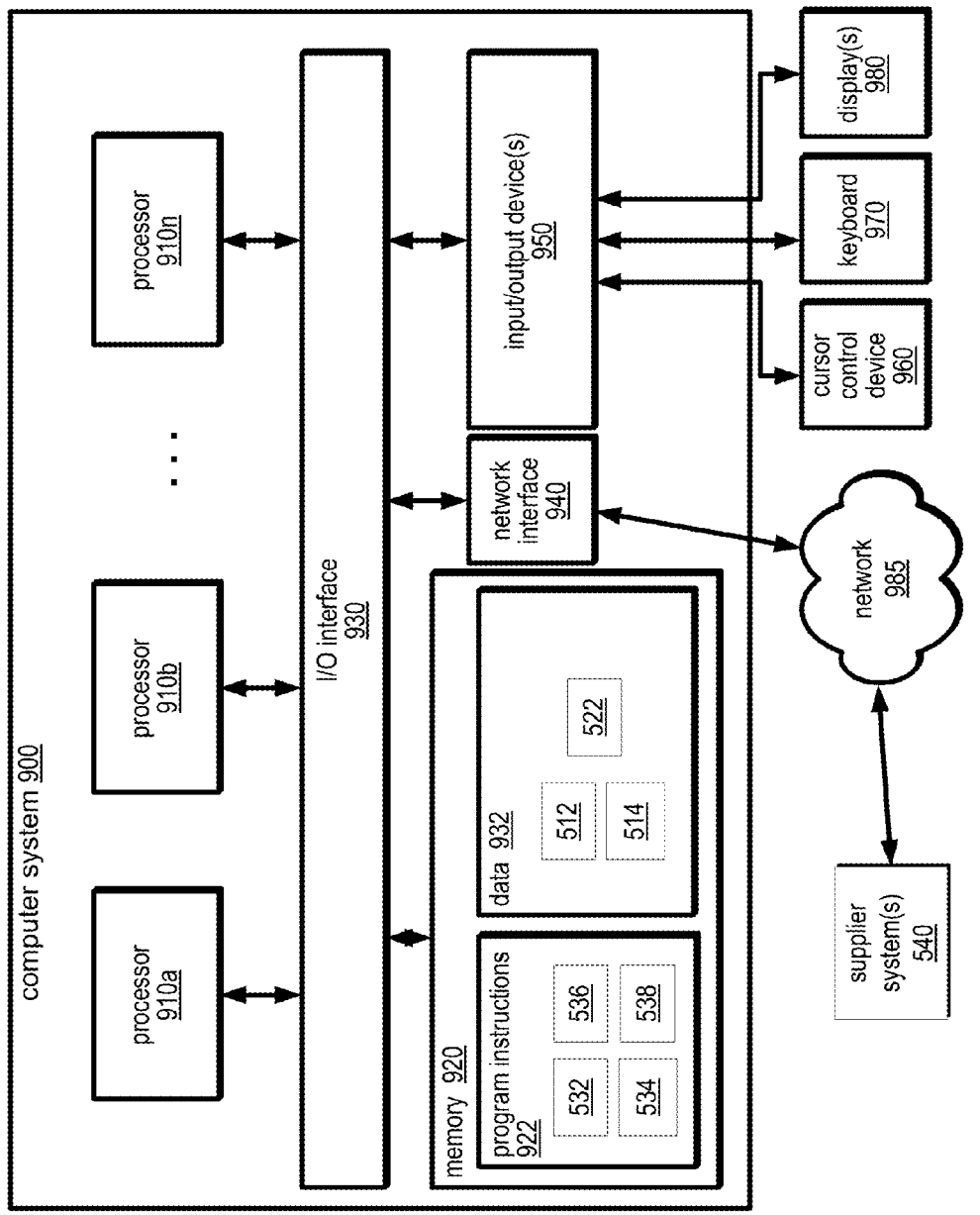
FIG. 9 illustrates one example of a computer system suitable for implementing various elements of the system and method for identifying structured data items lacking requisite information for rule-based duplicate detection, according to some embodiments.

As shown in FIG. 9, memory 920 may include program instructions 922, which may be processor-executable to implement any element or action described above. In one embodiment, the program instructions may implement the methods described above, such as the method illustrated by FIG. 8. In other embodiments, different elements and data may be included. Note that data 932 may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer-implemented method, comprising:
performing, by one or more computing devices:
generating a deficiency score for each of multiple structured data items, wherein generating the deficiency score of a given structured data item comprises applying a set of rules based on duplicate detection techniques to the given structured data item in order to perform a comparison of the given structured data item to itself, wherein the deficiency score of the given structured data item is based on a result of said comparison;
based on the deficiency scores of the structured data items, identifying one or more deficient structured data items having less than a requisite quantity of information for performing duplicate detection on structured data items;
identifying one or more key attributes missing from at least some of said one or more deficient structured data items; and
providing a request for additional item description information, wherein said request specifies said one or more key attributes.

2. The computer-implemented method of claim 1, wherein the method comprises, receiving said one or more key attributes and populating one or more of the structured data items with said key attributes to improve the quality of the structured data items.

3. The computer-implemented method of claim 1, wherein the method comprises applying a deficiency score threshold to the structured data items to identify the one or more deficient structured data items.

4. The computer-implemented method of claim 1, wherein said multiple structured data items include item description information associated with items of a particular product category, wherein at least some of said rules of said set are specific to that product category.

5. A computer-implemented method, comprising:
performing, by one or more computing devices:
generating a deficiency score for each of multiple structured data items, wherein generating the deficiency score of a given structured data item comprises applying a set of rules based on duplicate detection techniques to the given structured data item in order to perform a comparison of the given structured data item to itself, wherein the deficiency score of the given structured data item is based on a result of said comparison; and
based on the deficiency scores of the structured data items, identifying one or more deficient structured data items having less than a requisite quantity of information for performing duplicate detection on structured data items.

6. The computer-method of claim 5, wherein the method further comprises identifying one or more key attributes missing from at least some of said one or more deficient structured data items.

7. The computer-method of claim 6, wherein the method further comprises providing a request for additional item description information to an item supplier, wherein said request specifies that said one or more key attributes are requested from the supplier.

8. The computer-implemented method of claim 7, wherein the method comprises, receiving said one or more key attributes from the supplier and populating one or more of the structured data items with said key attributes to improve the quality of information within those structured data items.

9. The computer-implemented method of claim 5, wherein the method comprises applying a deficiency score threshold to the scored structured data items to identify said one or more deficient structured data items.

10. The computer-implemented method of claim 5, wherein at least some of the rules of said set of rules are generated using genetic techniques.

11. The computer-implemented method of claim 5, wherein said multiple structured data items include item description information associated with items of a particular product category, wherein at least some rules of said set of rules are specific to that product category.

12. A system, comprising:
one or more memories; and
one or more processors coupled to the memory, wherein the one or more memories comprise program instructions executable by the one or more processors to:
generate a deficiency score for each of multiple structured data items, wherein to generate the deficiency score of a given structured data item the program instructions are configured to apply a set of rules based on duplicate detection techniques to the given structured data item in order to perform a comparison of the given structured data item to itself, wherein the deficiency score of the given structured data item is based on a result of said comparison; and
based on the deficiency scores of the structured data items, identify one or more deficient structured data items having less than a requisite quantity of information for performing duplicate detection on structured data items.

13. The system of claim 12, wherein the program instructions are further configured to identify one or more key attributes missing from at least some of said one or more deficient structured data items.

14. The system of claim 13, wherein the program instructions are further configured to provide a request for additional item description information to an item supplier, wherein said request specifies that said one or more key attributes are requested from the supplier.

15. The system of claim 14, wherein the system is further configured to receive said one or more key attributes from the supplier and populating one or more of the structured data items with said key attributes to improve the quality of information within those structured data items.

16. The system of claim 12, wherein the program instructions are configured to apply a deficiency score threshold to the scored structured data items to identify said one or more deficient structured data items.

17. The system of claim 12, wherein at least some of the rules of said set of rules are generated using genetic techniques.

18. The system of claim 12, wherein said multiple structured data items include item description information associated with items of a particular product category, wherein at least some of said set of rules are specific to that product category.

19. A computer-readable storage medium, storing program instructions computer-executable on a computer to:
generate a deficiency score for each of multiple structured data items, wherein to generate the deficiency score of a given structured data item the program instructions are configured to apply a set of rules based on duplicate detection techniques to the given structured data item in order to perform a comparison of the given structured data item to itself, wherein the deficiency score of the given structured data item is based on a result of said comparison; and
based on the deficiency scores of the structured data items, identify one or more deficient structured data items having less than a requisite quantity of information for performing duplicate detection on structured data items.

20. The medium of claim 19, wherein the program instructions are further configured to identify one or more key attributes missing from at least some of said one or more deficient structured data items.

21. The medium of claim 20, wherein the program instructions are further configured to implement a supplier notification component configured to provide a request for additional item description information to an item supplier, wherein said request specifies that said one or more key attributes are requested from the supplier.

22. The medium of claim 21, wherein the system is further configured to receive said one or more key attributes from the supplier and populating one or more of the structured data items with said key attributes to improve the quality of information within those structured data items.

23. The medium of claim 19, wherein the program instructions are configured to apply a deficiency score threshold to the scored structured data items to identify said one or more deficient structured data items.

24. The medium of claim 19, wherein at least some of the rules of said set of rules are generated using genetic techniques.

25. The medium of claim 19, wherein said multiple structured data items include item description information associated with items of a particular product category, wherein at least some of said set of rules are specific to that product category.

* * * * *